United States Patent

Goodier et al.

[15] 3,638,583
[45] Feb. 1, 1972

[54] APPARATUS FOR BAKING DOUGHNUTS A GOODY-ER DONUT BAKER

[72] Inventors: Vera M. Goodier; Kenneth C. Goodier, both of 135 12th St. S.E., South East Puyallup, Wash. 98371

[22] Filed: Feb. 4, 1969

[21] Appl. No.: 796,443

[52] U.S. Cl. ......................................................... 249/122
[51] Int. Cl. .................................................... A47j 37/01
[58] Field of Search ..................... 107/19, 19 D, 54 C, 66; 99/403, 372, 376, 426, 428, 430, 439, 442; 220/2.5, 23.8

[56] References Cited

UNITED STATES PATENTS

| 586,195 | 7/1897 | Monroe | 99/428 UX |
| 1,476,910 | 12/1923 | Naugle | 107/19.4 UX |
| 1,663,719 | 3/1928 | Morley | 99/372 UX |
| 2,493,854 | 1/1950 | Brainard | 99/428 UX |
| 3,265,280 | 8/1966 | Butzko | 229/2.5 |

FOREIGN PATENTS OR APPLICATIONS

| 703,568 | 2/1954 | Great Britain | 99/442 |

Primary Examiner—Walter A. Scheel
Assistant Examiner—Arthur O. Henderson
Attorney—Roy E. Mattern, Jr.

[57] ABSTRACT

Apparatus for producing donuts by a baking rather than frying process in the form of a baking tin having a plurality of spaced apart wells or bowllike member, each with a prong extending axially therein. In use each well receives a proper amount of baking dough with the prong assisting by maintaining a hole in the center of the dough. After baking, each well contains a donut which can be easily removed for further decoration, icing and/or eating.

1 Claims, 5 Drawing Figures

PATENTED FEB 1 1972 3,638,583
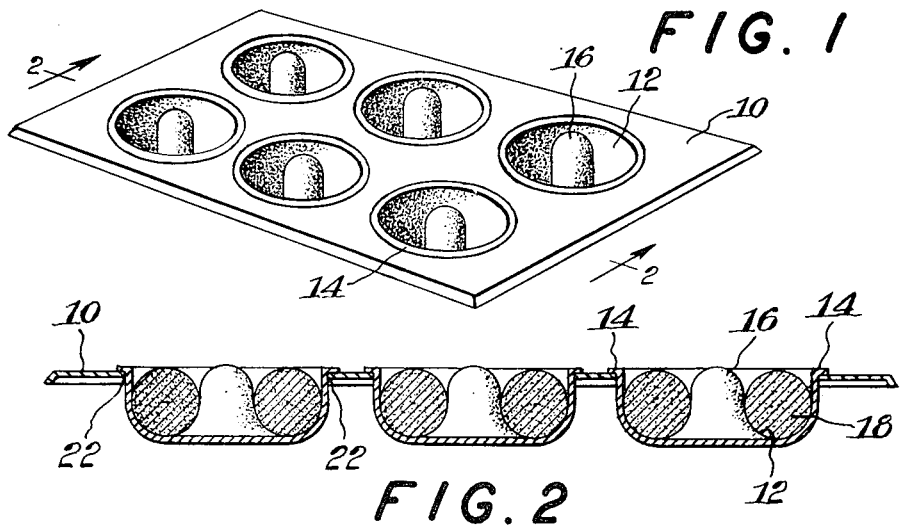
FIG. 1
FIG. 2
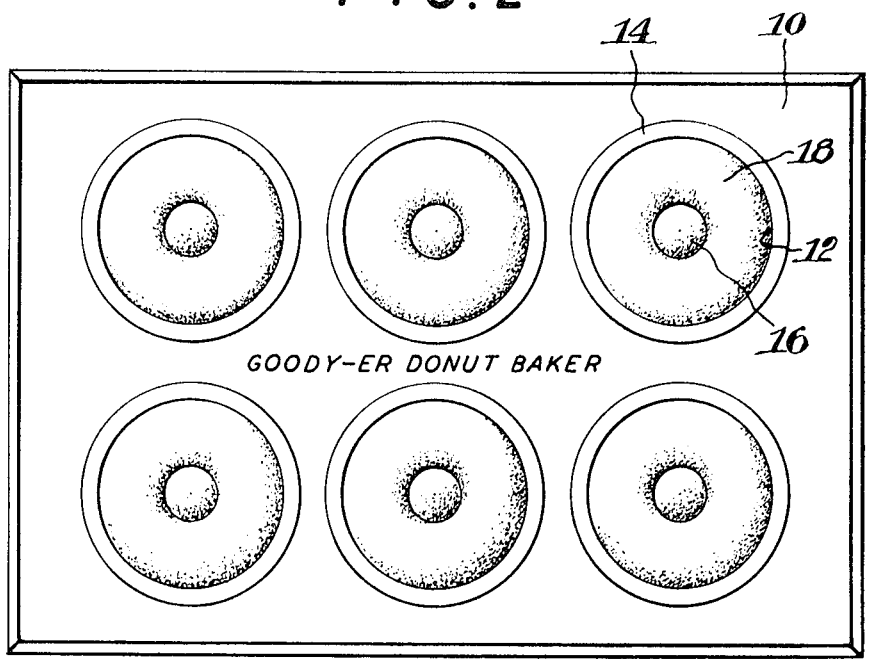
GOODY-ER DONUT BAKER
FIG. 3
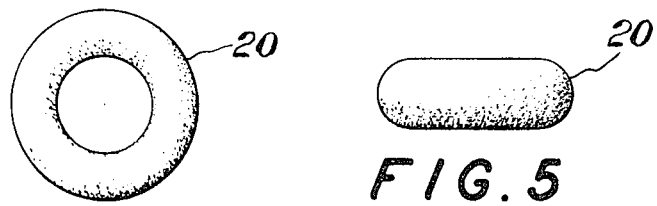
FIG. 4  FIG. 5
INVENTORS
VERA M. GOODIER
KENNETH C. GOODIER

APPARATUS FOR BAKING DOUGHNUTS A GOODY-ER DONUT BAKER

SUMMARY OF THE INVENTION

In our apparatus, which we call a "goody-er donut baker," we utilize a flat horizontal baking tin having a plurality of spaced bowllike members or wells therein with solid bottom surfaces. Each well has, in cross section a circular shape and is provided with a vertical prong or shaft which extends axially therein between the top and bottom of the well and is secured to the bottom thereof.

This apparatus can then be used for baking donuts as described.

BRIEF DESCRIPTION OF THE DRAWINGS

In the drawings:
FIG. 1 is a perspective view of our invention;
FIG. 2 is a view through 2—2 in FIG. 1;
FIG. 3 is a top view thereof; and
FIGS. 4 and 5 are top and side views, respectively, of donuts produced with the aid of our apparatus.

DETAILED DESCRIPTION OF PREFERRED EMBODIMENT

Referring now to FIGS. 1–5, a flat horizontal baking tin 10 has a plurality of spaced circular holes 22 therein. Disposed in each hole 22 is a corresponding bowl or well 12 having a lip 14 which is peripheral and flat and extends beyond the corresponding hole to hold the well in place. The bottom surface of each well is solid. A prong 16 (one for each well) is secured at one end to the center of the bottom surface and extends vertically and axially upward to be flush with the top surface of the corresponding well.

Typically, the top diameter of each well can be 3¼ inches, the diameter of the prong can be three-quarters of an inch, and the depth of each well or bowl can be 1 13/16 inches.

In use, each well is filled with baking dough or batter 18 which is maintained in donut shape by the prong. After baking, the donut 20 can be coated with icing, otherwise decorated and/or eaten. Since the donut is not fried, it is not greasy and can be eaten with relish by anyone including those who cannot or will not eat conventional fried donuts.

While we have described our invention with particular reference to the drawings such is not to be considered as limiting its actual scope.

Having thus thus described this invention what is asserted as new is:

We claim:

1. A baking tin for making conventional round doughnuts having the hole in the middle, comprising: a flat horizontal baking tin having a plurality of circular openings, a plurality of individual bowls positioned in said openings, said bowls each providing a cavity having an outer lip edge and a prong member extending vertically and axially upward from the center of the bottom surface of each bowl and terminating in the plane of said lip edge, each bowl cavity being complementary shaped to produce a conventional round doughnut having a hole in the middle and having a depth to match the full depth of a baked doughnut and being open at the top to permit entry of dough to be dropped in from above.

* * * * *